(12) United States Patent
Mitchell et al.

(10) Patent No.: US 6,503,042 B2
(45) Date of Patent: Jan. 7, 2003

(54) BULK MATERIAL HANDLING SYSTEM

(75) Inventors: Andrew P. Mitchell, Montoursville, PA (US); Richard W. Ambs, Williamsport, PA (US); Todd E. Kaufman, Montoursville, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 10/056,280

(22) Filed: Jan. 24, 2002

(65) Prior Publication Data

US 2002/0127064 A1 Sep. 12, 2002

Related U.S. Application Data

(62) Division of application No. 09/611,885, filed on Jul. 7, 2000, now Pat. No. 6,415,909.

(51) Int. Cl.[7] .................................................. B65G 1/00
(52) U.S. Cl. .................. 414/310; 414/139.9; 414/141.6
(58) Field of Search ............................... 406/107, 171, 406/172, 291, 310; 414/318, 716, 733, 550.8, 306, 139.9, 140.5, 141.6; 198/550.1, 494

(56) References Cited

U.S. PATENT DOCUMENTS

| | | | | | |
|---|---|---|---|---|---|
| 2,130,492 A | * | 9/1938 | Hapman | ...................... | 198/170 |
| 2,147,199 A | * | 2/1939 | Hapman | ...................... | 198/176 |
| 2,258,429 A | * | 10/1941 | Stone | ........................... | 198/43 |
| 2,311,084 A | * | 2/1943 | Redler | ......................... | 198/126 |
| 2,756,866 A | * | 7/1956 | Wilde | .......................... | 198/168 |
| 2,922,511 A | * | 1/1960 | Ruppe | ......................... | 198/176 |
| 3,003,464 A | * | 10/1961 | Bailey | .......................... | 119/52 |
| 3,707,998 A | * | 1/1973 | Dalrymple | .................... | 141/93 |
| 4,889,452 A | * | 12/1989 | Heyl | ............................ | 406/85 |
| 5,487,229 A | * | 1/1996 | Nathenson et al. | ........... | 37/347 |
| 5,947,333 A | * | 9/1999 | Hoffmann v | ................. | 222/105 |
| 5,947,646 A | * | 9/1999 | Lytle | ............................ | 406/48 |
| 6,068,429 A | * | 5/2000 | Schultheis | .................. | 406/172 |

* cited by examiner

Primary Examiner—Christopher P. Ellis
Assistant Examiner—Joe Dillon, Jr.
(74) Attorney, Agent, or Firm—Stevens, Davis, Miller & Mosher

(57) ABSTRACT

An apparatus for conveying bulk material generally consisting of a support, a guide member defining a passageway providing a circuitous path, having a base section supported on the support and a section cantilevered relative to the support; at least two sprockets disposed in such passageway and rotatably supported on the guide member, one of such sprockets being disposed in the cantilevered section of the guide member and having a substantially vertically disposed axis of rotation; a rope assembly including an endless rope disposed in the passageway along the circuitous path and reeved around the sprockets, and a plurality of discs spaced along such rope, and a motor for driving one of the sprockets, wherein the guide member includes a inlet communicating with the passageway for feeding material therein and a discharge outlet communicating with the passageway about a portion of the periphery of the one socket.

30 Claims, 11 Drawing Sheets

BULK MATERIAL HANDLING SYSTEM

This application is a division of application Ser. No. 09/611,885, filed Jul. 7, 2000, now U.S. Pat. No. 6,415,909. This invention broadly relates to a system and method for transporting bulk materials from a first geographic location to a distant, second geographic location. It further contemplates a novel system and method for loading bulk material into a transportable container.

BACKGROUND OF THE INVENTION

In many industries, modular steel containers have become a common and useful means for transporting various goods and materials. Such containers typically are mounted on flat bed trucks and trailers for overland shipment, placed on railway cars for rail shipment, loaded on the decks of freighters for overseas shipment and even placed in air craft for air shipment. For shipment of bulk commodities, plastic film liners have been developed for use in such containers which provide for the shipment of a large variety bulk materials without danger of contamination or spillage of the materials being transported. Along with the development and use of liners in modular shipping containers for handling bulk materials, there has developed the requirement to provide machinery for filling lined modular containers efficiently without causing any damage to the liners thereof. In the prior art, various bulk material loading methods have been used for filling such lined containers but with limited degrees of success.

An example of an existing method of loading a bulk material into a lined container is the use of a pneumatic conveying system. Such system has become popular in use because of its comparatively simple construction, essentially requiring a length of conduit and a supply of high velocity and volume of air, its capability of conveying material to the far end of a container and its ability to convey material relatively long distances to modular containers without contamination or spillage. However, such type of system has a number of disadvantages which limits its effectiveness in loading lined modular containers. Such disadvantages include the relatively high energy cost in producing a high volume and velocity air stream for conveying the materials, the risk of rupture of the liners within the containers caused by the impingement of material particles propelled at high speeds, resulting in material contamination or spillage, the risk of overpressurizing the container causing possible damage to the liner or the container, and the problem of handling large volumes of dust and air in the containers.

It thus has been found to be desirable to provide an improved system and method of transporting bulk materials and more specifically an improved system and method for loading bulk materials into lined shipping containers in which such containers are efficiently filled without rupturing or otherwise damaging the liner or the container.

SUMMARY OF THE INVENTION

The present generally provides for a container which may be loaded with a bulk material at a first geographical site, transported to a second geographical site by means of land, sea or aircraft and unloaded at such second site, and a bulk material loader located at the first geographical site. The container preferably is provided with a liner within the compartment thereof and an access opening communicable with the interior of the liner, in an end wall thereof, adjacent a top wall of the container. The loader comprises a mechanical type conveyor generally including a drive sprocket, a spaced driven sprocket and a rope assembly including a rope disposed along a circuitous path and reeved about such sprockets and a plurality of discs secured to and spaced along the rope driven at high speeds for creating a column of air and conveying bulk material in the conventional manner. The conveyor is provided with a cantilevered section including the driven sprocket, which is insertable through the access opening in the container end wall for conveying material into the container compartment. The driven sprocket in the cantilevered, insertable section of the conveyor is oriented with its axis of rotation disposed substantially vertically so that the sprocket may be positioned close to the upper end of the container compartment and displaced along the length of the compartment to tangentially disperse material carried by the rope assembly, throughout the compartment. The container end wall also is provided with a discharge opening at the lower end thereof to permit the discharge of material in the compartment at the final destination of the container simply by tilting the container to cause the gravity flow of material through the discharge opening.

The access opening in the container end wall may be disposed in the center of the end wall or adjacent a side wall of the container. In addition, the container end wall may be provided with a pair of access openings and the conveyor may be provided with a pair cantilevered sections insertable into such access openings. In such latter arrangement, it is contemplated that the rope assemblies of the two sections would be driven in opposite directions to provide a suitable dispersion pattern of the material injected into the container compartment.

BRIEF DESCRIPTIONS OF THE DRAWINGS

DESCRIPTION OF THE PREFERRED EMBODIMENTS OF THE INVENTION

Figure 1:
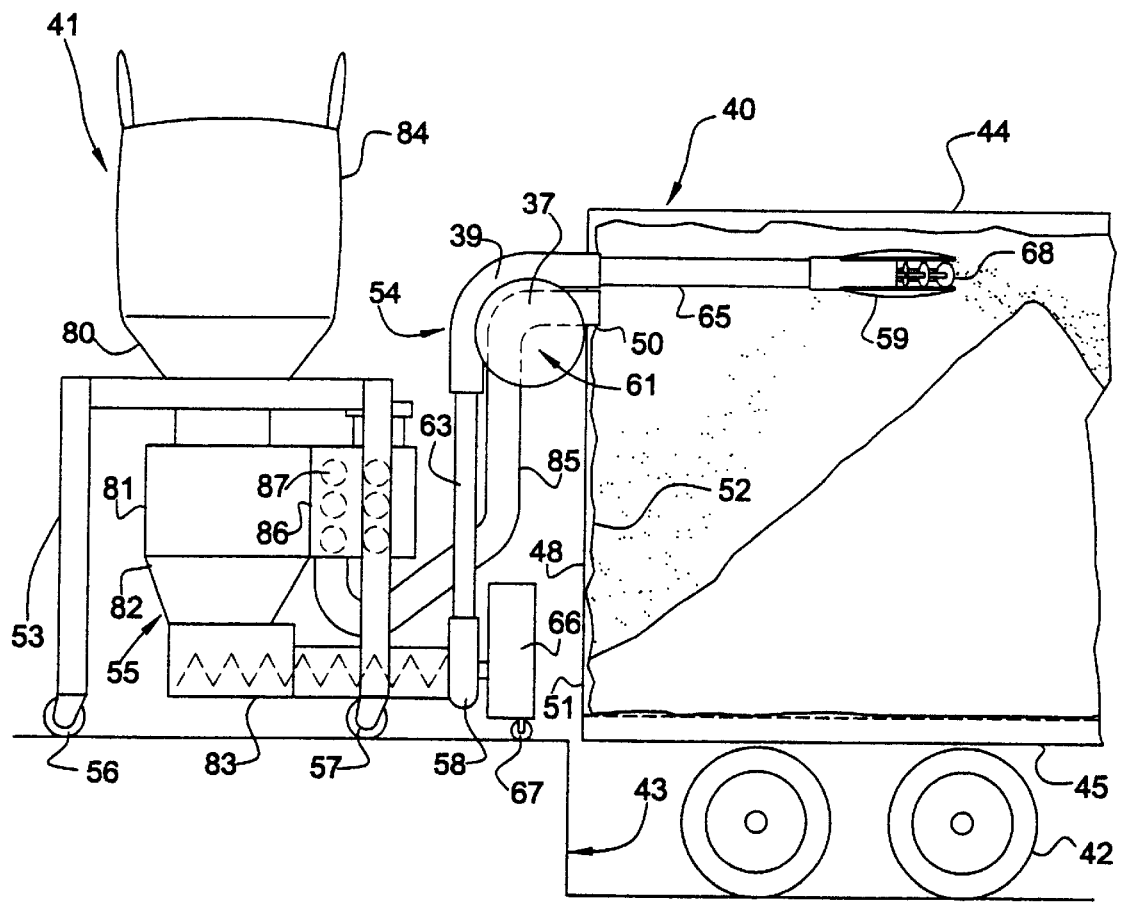
FIG. 1 is a side elevation view of a bulk material handling system embodying the present invention, having a portion thereof broken away.
Figure 2:
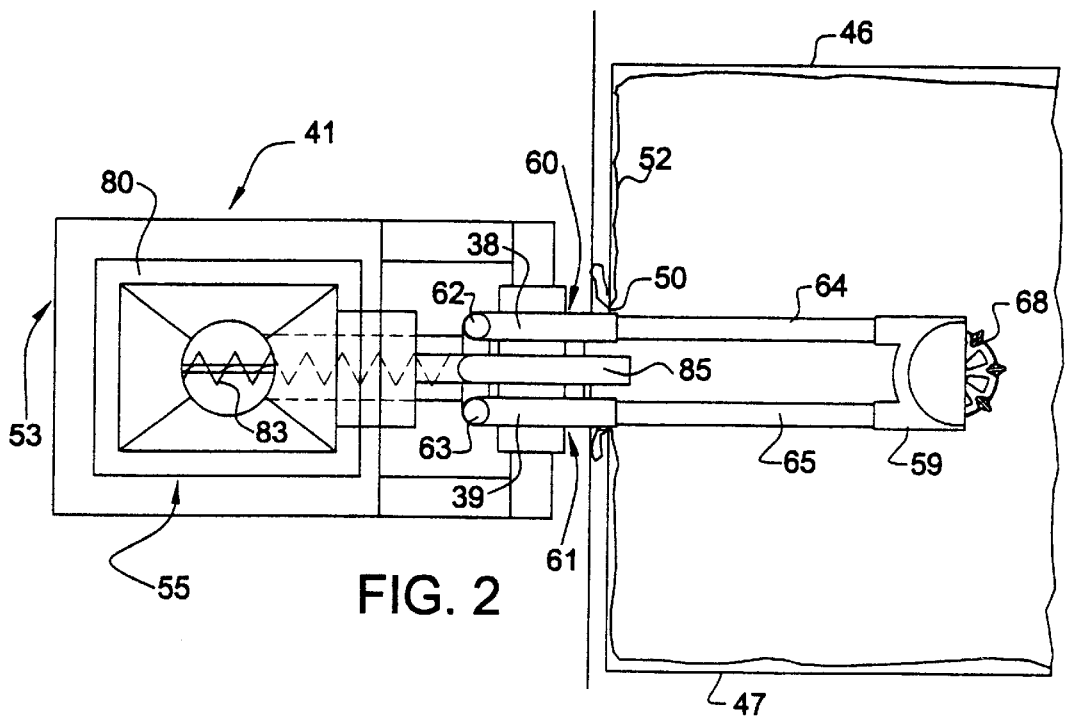
FIG. 2 is a top plan view of the embodiment shown in FIG. 1.
Figure 3:
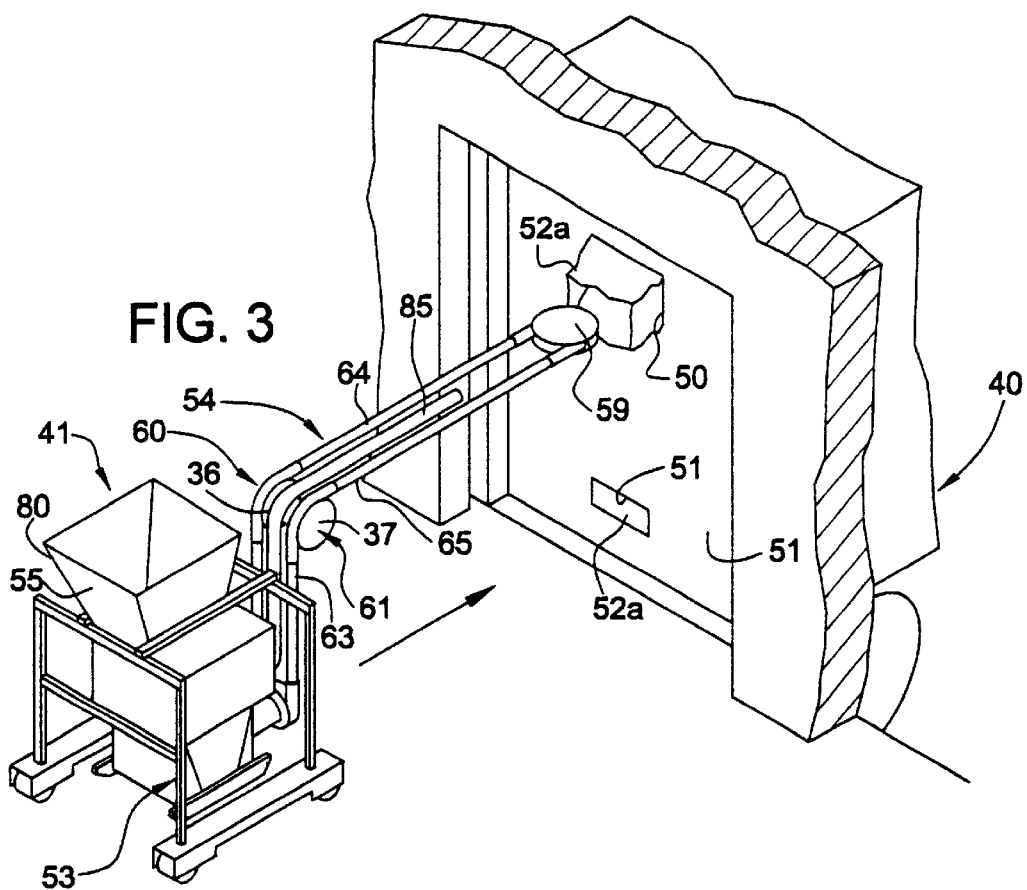
FIG. 3 is a perspective view of the embodiment shown in FIGS. 1 and 2, illustrating a cantilevered section of a conveyor aligned with an access opening in the rear end of a container prior to insertion thereof.
Figure 4:
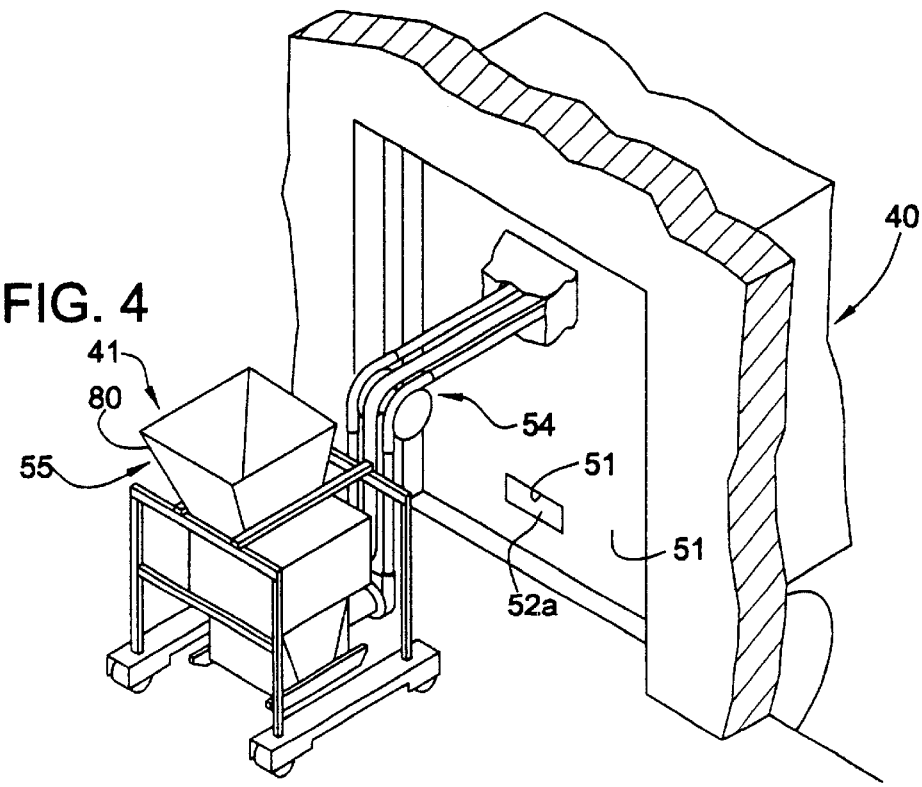
FIG. 4 is a perspective view similar to the view shown in FIG. 3, illustrating the conveyor as having been advanced toward the container with the cantilevered section thereof inserted into the access opening in the end wall of the container.

Referring to FIGS. 1 through 9 of the drawings, there is illustrated a material handling system incorporating an embodiment of the invention. Generally, the system includes a container 40 and a conveyor assembly 41. Container 40 is adapted to be mounted on the flat bed of a truck 42 which may be maneuvered to a position adjacent a loading dock 43 as shown in FIG. 1. It preferably is constructed of steel and has a substantially rectangular configuration including top and bottom walls 44 and 45, a pair of side walls 46 and 47, a rear end wall 48 and a front wall (not shown) defining a compartment 49. Container end wall 48 is provided with an access opening 50 and a discharge opening 51. Access opening 50 is disposed in the center of end wall 48 adjacent container top wall 41. Discharge opening 51 similarly is disposed in the center of container end wall 48 adjacent bottom wall 45. Disposed within compartment 49 is a plastic film liner 52 which is adapted to conform to the interior configuration of compartment 49. Typically, such a liner will be closed, will be suspended from hangers secured to the container top wall and will be secured to the bottom wall for receiving bulk material to be loaded within the container. A rear section of the liner engaging the container end wall 48 is provided with a spout portion 52a which is adapted to extend through access opening 50, and a spout portion 52b adapted to extend through discharge opening 51. When the liner in compartment 49 is filled with bulk material to be transported, spouts 52a and 52b are adapted to be closed and secured to prevent loss of material therethrough.

Conveyor 41 is adapted to cooperate with container 40 to load bulk material therein, and includes a support frame structure 53, a mechanical conveyor assembly 54 supported on the support frame structure and a material feeding assembly 55. Frame structure 53 may be stationary and secured to dock 43 or may be supported on sets of wheels 56 and 57 to permit the conveyor to be displaced along a line of travel toward and away from a container 40 mounted on a truck backed up to dock 43. Such structure also may be supported on rollers provided with a set of tracks for displacing the frame structure along the fixed line of travel.

Figure 5:
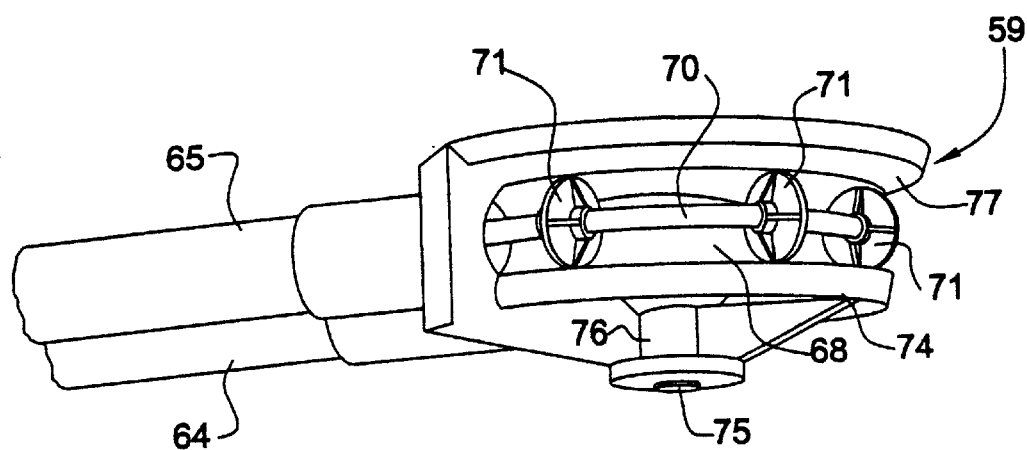
FIG. 5 is an enlarged, perspective view of the end portion of the cantilevered section of the conveyor shown in FIGS. 1 through 4, having a portion thereof broken away.
Figure 6:
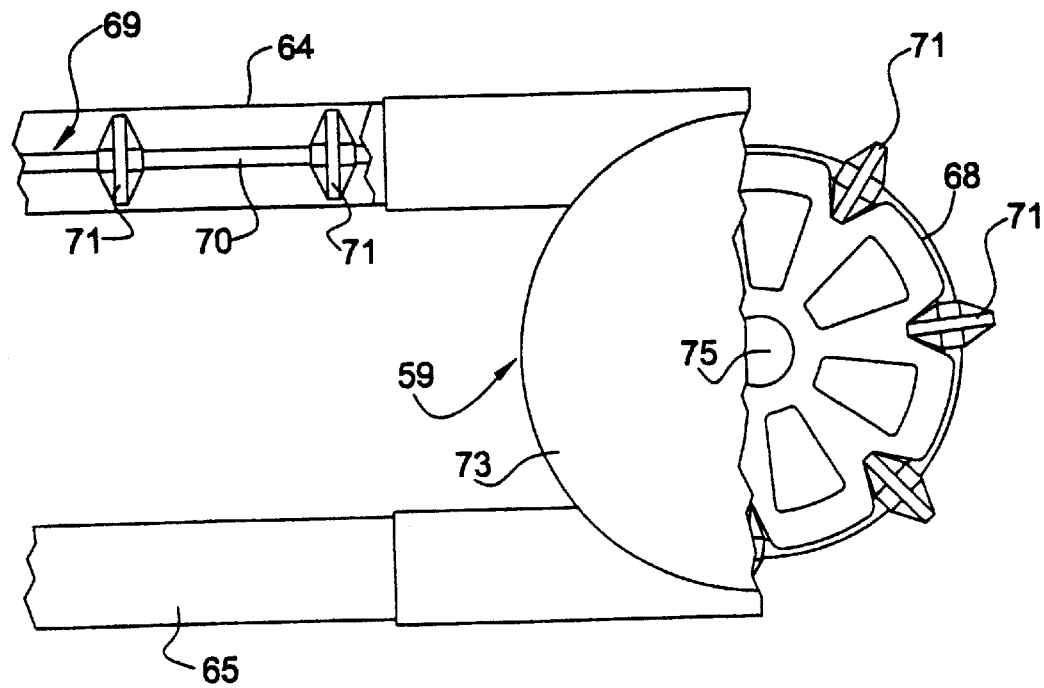
FIG. 6 is a top plan view of the portion of the cantilevered section of the conveyor shown in FIG. 5, having portions thereof broken away.

Mechanical conveyor 54 includes a base housing 58 supported on frame structure 53, a head or discharge housing 59, a pair of intermediate housings 60 and 61, a pair of substantially vertically disposed conduits 62 and 63 interconnecting and intercommunicating base housing 58 and intermediate housings 60 and 61, and a pair conduits 64 and 65 interconnecting and intercommunicating housings 60 and 61 and head housing 59. Such housings and conduits define a closed circuitous passageway between base housing 58 and head housing 59. Journaled in base housing 58 is a drive sprocket (not shown) adapted to be driven by a motor mounted in a housing 66 partially supported on a set of wheels 67. Disposed in intermediate housings 60 and 61 is a pair of similar sprockets (not shown) and disposed in head housing 59 is a driven sprocket 68 as best seen in FIGS. 5 and 6. Disposed in the passageway defined by such housings and conduits is a rope assembly 69 including an endless rope 70 reeved about the sprockets mounted in housings 58, 60, 61 and 59 and a plurality of discs 71 secured to and spaced along rope 70. As best shown in FIG. 6, each of the sprockets is provided with circumferentially spaced recesses for receiving the spaced discs of the rope assembly as a segment of the rope passes around a grooved periphery of the socket.

Functionally, mechanical conveyor 54 operates in generally the same manner as the bulk material conveyor described in U.S. Pat. No. 5,186,312, assigned to the assignee of the present invention, which is incorporated herein by reference. The conveyor generally operates in a manner whereby upon operation of the motor mounted in housing 66, the sprocket mounted in base housing 58 will be driven to correspondingly drive the rope assembly. As the rope assembly is driven at a high speed in the order of 720 feet per minute, bulk material fed into base housing 58 will be caused to be displaced from base housing 58 to head housing 59 and be discharged therefrom. Discs 71 are clearance fit within the conduits and because of the speed at which they travel, they exert both air and material displacement. Such action tends to cause the materials to take on a fluid like property which enhances volumetric output.

Conduits 64 and 65 and head housing 59 lie in a substantially horizontal plane and constitute a cantilevered section of mechanical conveyor 54. Such section is disposed at a height sufficient to permit its insertion into access opening 50 when container 40 is positioned relative to the loader assembly as shown in FIG. 1. Under such conditions, the cantilevered section will not only be insertable through the access opening in the container end wall but also will be positioned at an uppermost portion of compartment 49 within liner 52.

As best shown in FIGS. 5 and 6, head housing 59 includes a rear end wall 72 provided with openings communicating with the interiors of conduits 64 and 65, and upper and lower walls 73 and 74. Sprocket 68 is mounted between such upper and lower walls and is provided with a substantially vertical shaft 75 journaled in a depending hub portion 76 of lower housing wall 74. The outer arcuate edges of upper and lower walls 73 and 74 cooperate with rear wall 72 to provide an arcuate opening 77 of housing 59, through which bulk material displaced by rope assembly 69 from base housing 58 is discharged. The centrifugal force exerted by the rope assembly traveling about the outer periphery of sprocket 68 causes material displaced by the rope assembly to be dispersed tangentially relative to sprocket 68, through arcuate discharge opening 77. The particular dispersion pattern of the conveyor will depend on the material being conveyed, the speed at which the rope assembly is driven and the dimensions of the components. FIGS. 14 through 18 illustrate sample patterns in which bulk material is caused to be deposited within compartment 49. The arcuate length and the position of arcuate discharge opening 77 may be varied and the direction of drive of the rope assembly may be reversed to provide different material dispersion patterns.

Material feeding assembly 55 includes an upper hopper 80 supported on frame structure 53 having a lower duct portion 81 communicating with a housing 81 provided with a lower hopper 82. A horizontally disposed screw conveyor 83 intercommunicates the lower end of hopper 82 with an inlet of base housing 58. Upper hopper 80 is adapted to receive the lower end of a bag 84 holding a supply of bulk material to be loaded into container 40, which is provided with a bottom opening to permit material contained therein to be gravity fed through housing 81 and hopper 82 into screw conveyor 83 which then functions to feed the material into base housing 58. As previously indicated, the discs of the rope assembly will engage and convey material fed into base housing 58 to head housing 59 from where it is dispersed tangentially into compartment 49 within liner 52. The high speed of the rope assembly functions to fluidize the material displaced by discs 71 thus enhancing the flow of material from base housing 58 to head housing 59. Also, provided on mechanical conveyor 54 is a vent line 85. An inlet portion of such line is mounted on the cantilevered section of the mechanical conveyor and is insertable through access opening 50 with the cantilevered section into a compartment 49 within the liner. The discharge end of such line is connected to a filter section 86 of housing 81. Filter section 86 includes a number of transversely disposed filter elements 87 through which air is drawn by impeller in the conventional manner. Vent line 85 functions to vent airborne particles of bulk material produced by the discharge of bulk material from the head housing of the conveyor. Airborne particles drawn through vent line 85 are conveyed to filter section 86 and filtered out of the carrier stream of air by filter elements 87. Periodically, filter elements 87 are backflushed to dislodge any bulk material particles deposited thereon causing such dislodged particles to gravity fall into screw conveyor 83 to be fed back into mechanical conveyor.

Containers 40 are designed and dimensioned so that a truck or trailer on which such a container is mounted may be maneuvered into a loading position relative to a dock as shown in FIG. 1, to permit the insertion of the cantilevered section of the mechanical conveyor through the access opening in the rear end wall of the container. The access opening further would be positioned adjacent the top wall of the container so that when the cantilevered section of the mechanical conveyor is inserted through the access opening, it will be positioned as close to the top wall of the container as possible in order to maximize the amount of material to be loaded into the container.

In the operation of the system as shown in FIGS. 1 through 6, with container 40 and loader assembly 41 properly configured and the loader assembly in a retracted condition, truck 42 having container 40 mounted thereon is maneuvered to position container 40 adjacent loader dock 43 with access opening 50 longitudinally aligned with the cantilevered section of the mechanical conveyor of assembly 41. With the cantilevered section and the access opening thus properly longitudinally aligned, liner spout 52a is drawn through access opening 50 and spread apart to provide an opening for the insertion of the cantilevered section into the compartment within the liner. Loader assembly 41 is then advanced toward the container to insert the cantilevered section into the container within the liner. The extent to which the cantilevered section is inserted into the container compartment will depend on the length of the compartment, the amount of material to be loaded into the container and the dispersion pattern desired. Once the cantilevered section is in the inserted position, the drive motor of the conveyor is operated to cause the rope assembly to begin travel. Screw conveyor 83 is then operated to begin feeding material from holding bag 84 to base housing 58. Bulk material thus fed into base housing 58 will be conveyed to discharge housing 59 to be dispersed tangentially therefrom into the compartment within the liner. Prior to such operation, however, liner spout 52a will be gathered around and secured to the cantilevered section of the mechanical conveyor and a portion of vent line 84 to seal the opening between the liner spout and the cantilevered section components. Airborne particles produced by the bulk material dispensed by the rope assembly within the container will be cause to be drawn through the inlet of the vent line and conveyed to filter section 85 from where it subsequently will be caused to be dislodged and recirculated into the mechanical conveyor through the screw conveyor. As the bulk material is thus loaded into the container, the loader assembly may be either maintained in a single position or displaced along a longitudinal line of travel to alter the disposition of the bulk material within the container.

Figure 7:
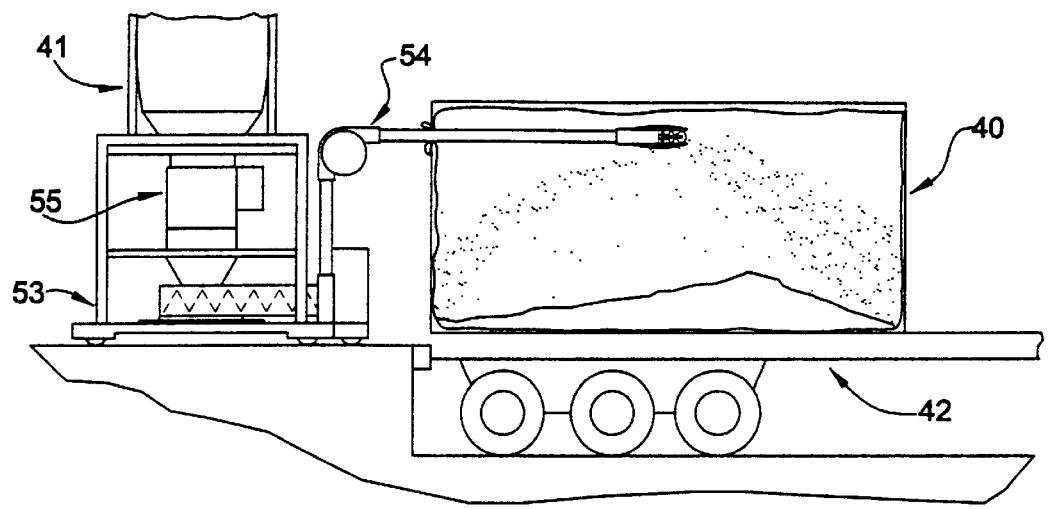
FIGS. 7 through 9 are side elevational views of the system shown in FIGS. 1 through 4, illustrating the cantilevered section of the conveyor inserted into the container compartment and further illustrating sequences in the filling of the container compartment with bulk material.
Figure 8:
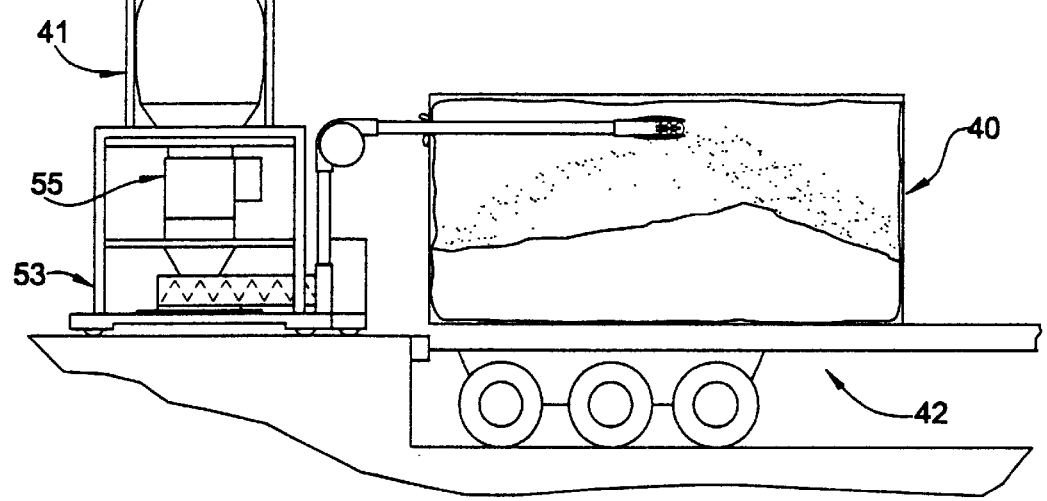
Figure 9:
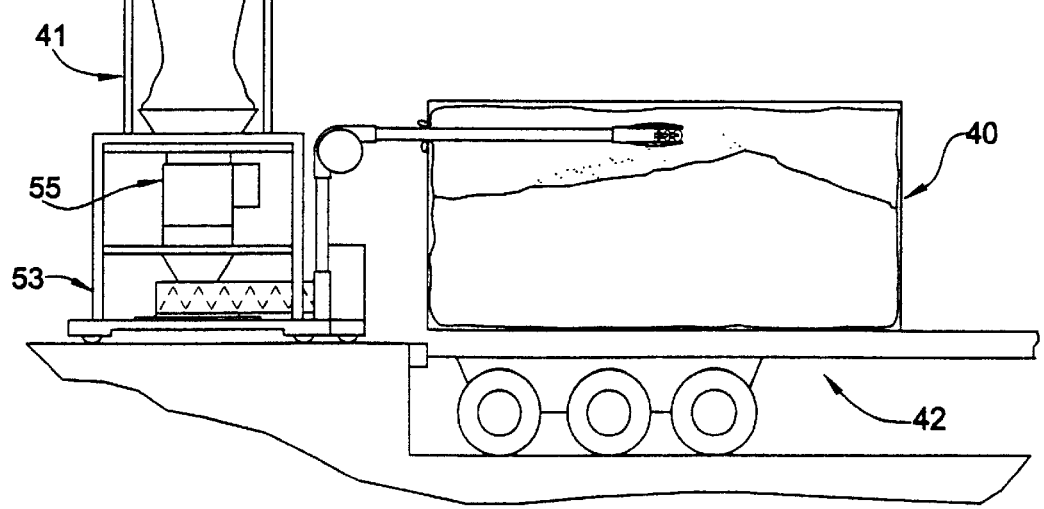
Figure 27:
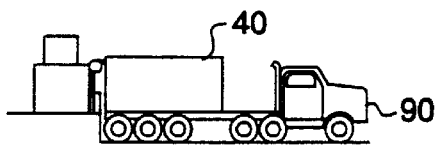
FIG. 27 is a side elevational view of an embodiment of the invention, illustrating the container portion thereof mounted on the flat bed of a truck.
Figure 28:
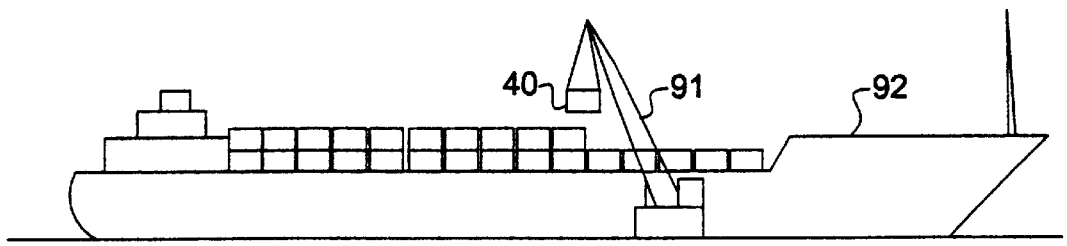
FIG. 28 is a side elevational view of a seagoing freighter having bulk material containers loaded on the deck thereof, forming components of the present invention.
Figure 29:
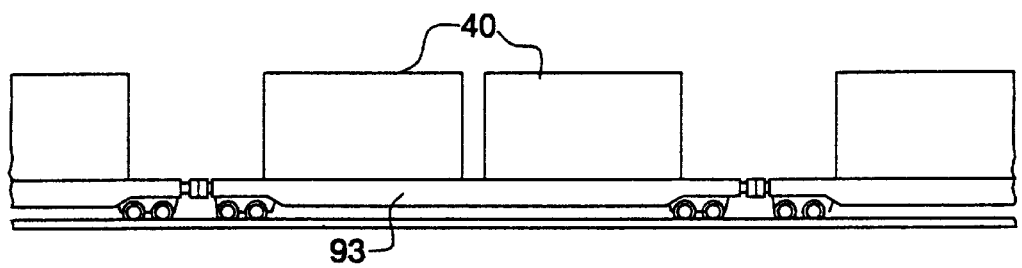
FIG. 29 is a side elevational view of several railway cars having bulk material containers placed thereon, forming components of the present invention.
Figure 30:
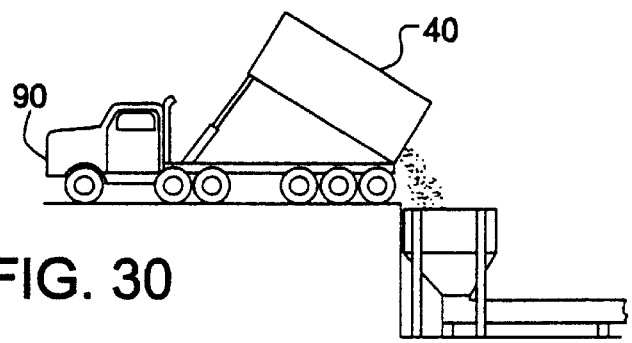
FIG. 30 is a side elevational view of a truck carrying a container forming components of the present invention, illustrating the container being dumped at a destination site.
Figure 31:
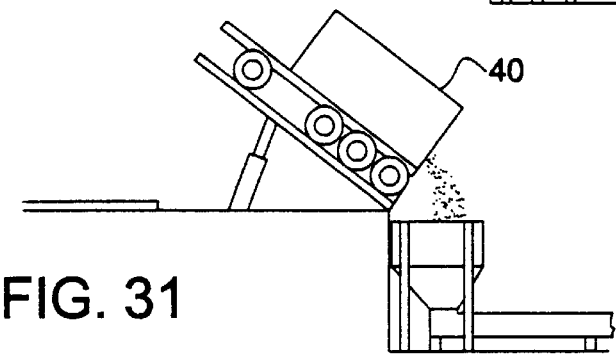
FIG. 31 is a side elevational view of a container mounted on a trailer forming components of an embodiment of the invention, illustrating the trailer being tilted to discharge the contents of the container.

FIGS. 7 through 9 illustrate a sequence in the filling operation in the manner described. The tangential dispersement of the bulk material from the discharge housing and possibly the displacement of the cantilevered section within the container result in a fairly uniform deposit of material within container, as shown. Furthermore, the fairly shallow profile of the cantilevered section of the mechanical conveyor within the container adjacent the top wall thereof permits the container to be filled to a capacity of about 80%. Once the container within the liner is filled up to a level just below the discharge head of the cantilevered section within the container, the drive of the rope assembly is discontinued and the loader assembly is displaced away from the container to withdraw the cantilevered section from within the container. After the cantilevered section has been withdrawn, liner spout 52a may be closed thus allowing for the truck or trailer on which the container is mounted to be driven away and thus transport the container to a desired destination. The loaded container mounted on a truck or a trailer may be transported on such truck or trailer to its final destination or may be unloaded and reloaded onto another mode of transportation including a land vehicle, a water craft or an air craft as shown in FIGS. 27 through 29. A container mounted on a vehicle as shown in FIG. 1 or reloaded on a vehicle subsequent to being transported by means of other modes of transportation as described, may be unloaded by suitably positioning the truck or trailer carrying the container relative to a receiving hopper, drawing discharge spout 52b through discharge opening 50 in the container rear wall and either tilting the container relative to the flat bed of the truck or trailer or tilting the entire truck or trailer as shown in FIGS. 30 and 31 to cause the bulk material within the container to gravity flow through the discharge spout into the receiving hopper.

A container loaded as described may be transported from the loading site to its final destination either by a single mode of transportation or by intermodal means including land, sea and aircraft, and various combinations of such transport means. FIG. 27 illustrates a container 40 transportable on a truck 90. FIG. 28 illustrates a container 40 which may be offloaded from a truck, trailer or railway car by a crane 91 and loaded onto the deck of a seagoing freighter 92. FIG. 29 illustrates a container 40 loaded onto a flat bed railway car 93.

Figure 10:
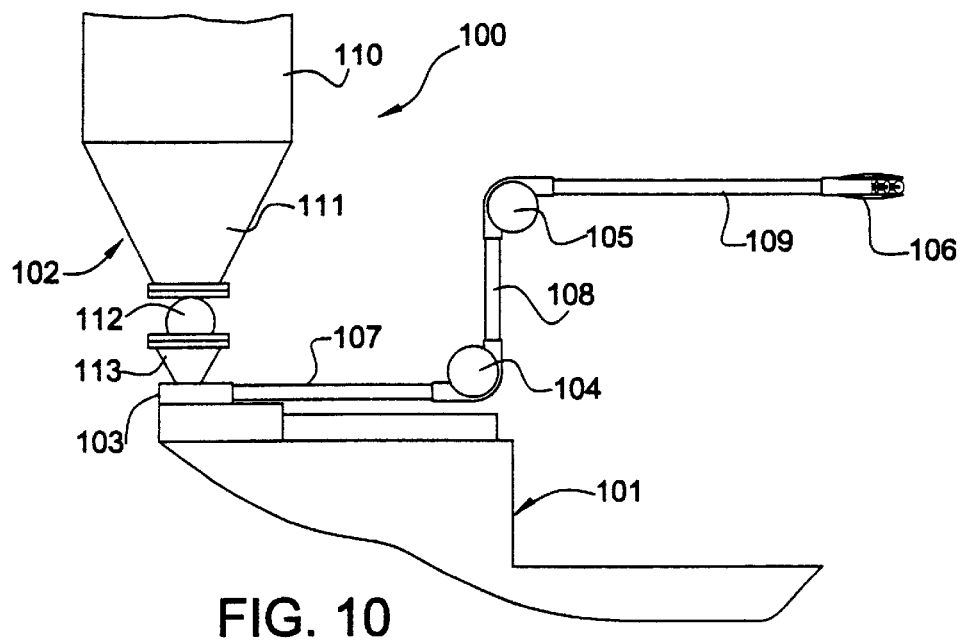
FIG. 10 is a side elevational view of a conveyor incorporating another embodiment of the invention.

Although the loader assembly consisting of the support frame structure 53 and the mechanical conveyor 54 and the material feed assembly 55 mounted on the support frame structure, has been described as being displaceable along a line of travel for inserting and withdrawing the cantilevered section of the mechanical conveyor relative to a container compartment, it is within the contemplation of the present invention to provide for a stationary loader assembly as shown in FIG. 10. The loader assembly shown in FIG. 10 consists of a mechanical conveyor 100 stationarily mounted on a loading dock 101, and a material feeding assembly 102. Conveyor 100 includes a base housing 103, pairs of vertically spaced intermediate housings 104 and 105 and a discharge housing 106. Interconnecting and intercommunicating base housing 103 and intermediate housings 104 is a pair of horizontally disposed, transversely spaced conduits 107, interconnecting and intercommunicating pairs of intermediate housings 104 and 105 is a pair of vertically disposed, transversely spaced conduits 108 and interconnecting and intercommunicating intermediate housings 105 and discharge housing 106 is a pair of horizontally disposed, transversely spaced conduits 109. Mounted in such housings are a set of sprockets, and further disposed within said housings and conduits is a rope assembly comparable to rope assembly 69 which is operable to convey material fed into base housing 103 to discharge housing 106. Discharge housing 106 and the sprocket mounted therein are comparable to discharge housing 59 and sprocket 68 mounted therein. They operate in a manner similar to sprocket 68 and rope assembly 69 to disperse material from discharge housing 106 into a container in which the cantilevered section of mechanical conveyor 100, consisting of conduits 109 and discharge housing 106, may be inserted. Insertion of the cantilevered section of the assembly may be positioned into a loading position by backing a truck having a container mounted thereon so that such cantilevered section is received through an access opening in the container, into the compartment of such container. Feed assembly 102 consists of a bulk material holding vessel 110 having a lower hopper section 111 adapted to convey material through a rotary valve 112 and a lower hopper section 113 into base section 103 of a mechanical conveyor.

Figures 11, 13:
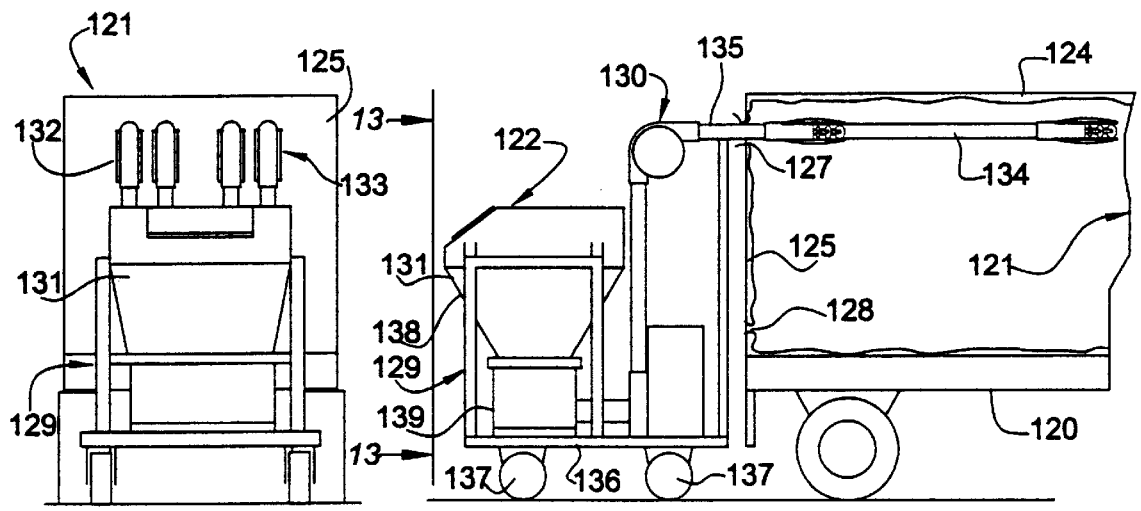
FIG. 11 is a side elevational view of a conveyor and a container incorporating a further embodiment of the invention.
FIG. 13 is a cross-sectional view taken along line 13—13 in FIG. 11.
Figure 12:
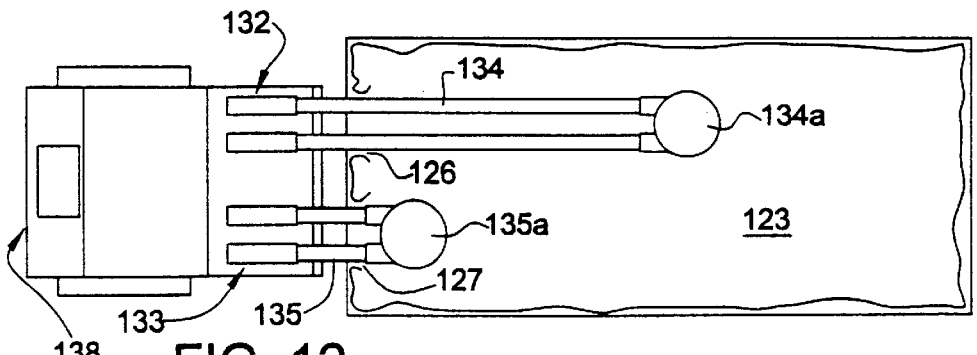
FIG. 12 is a top plan view of the embodiment shown in FIG. 11.
Figure 14:
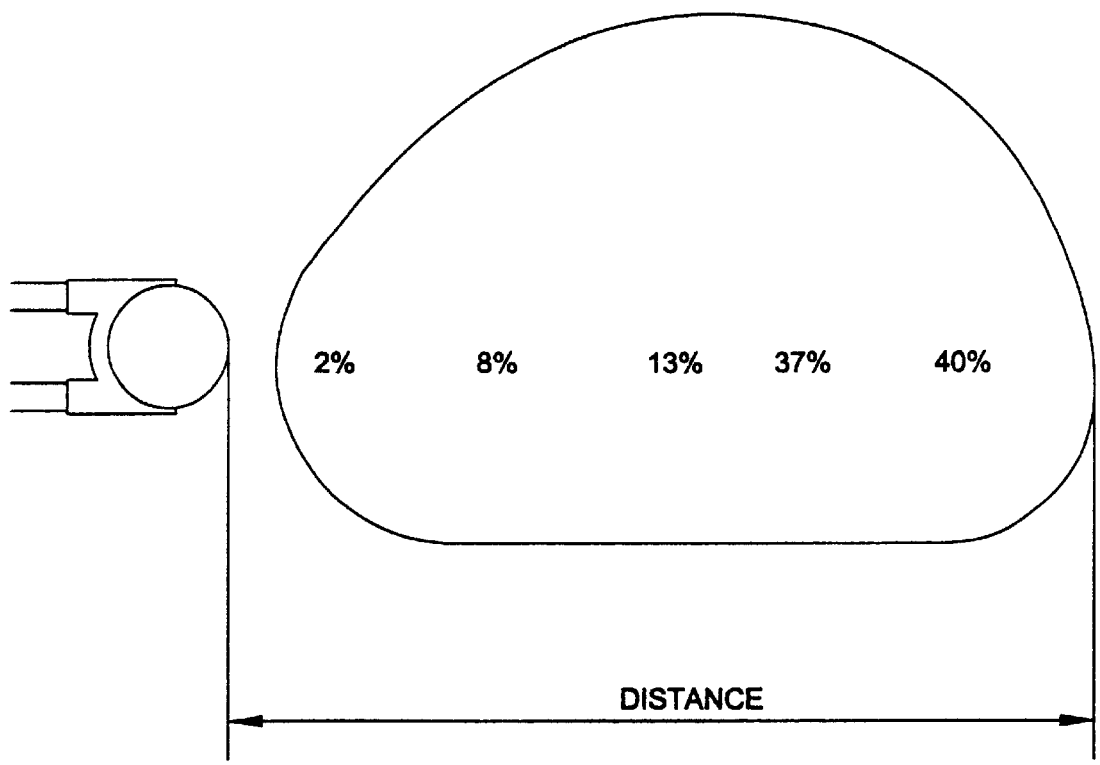
FIG. 14 is a top plan view of the dispersion pattern of material resulting from the use of an embodiment of the invention.
Figure 15:
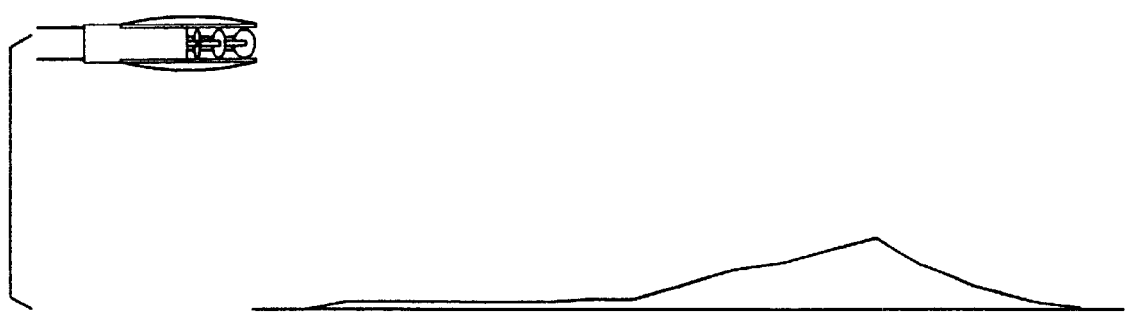
FIG. 15 is a side elevational view of the dispersion pattern shown in FIG. 14.
Figure 16:
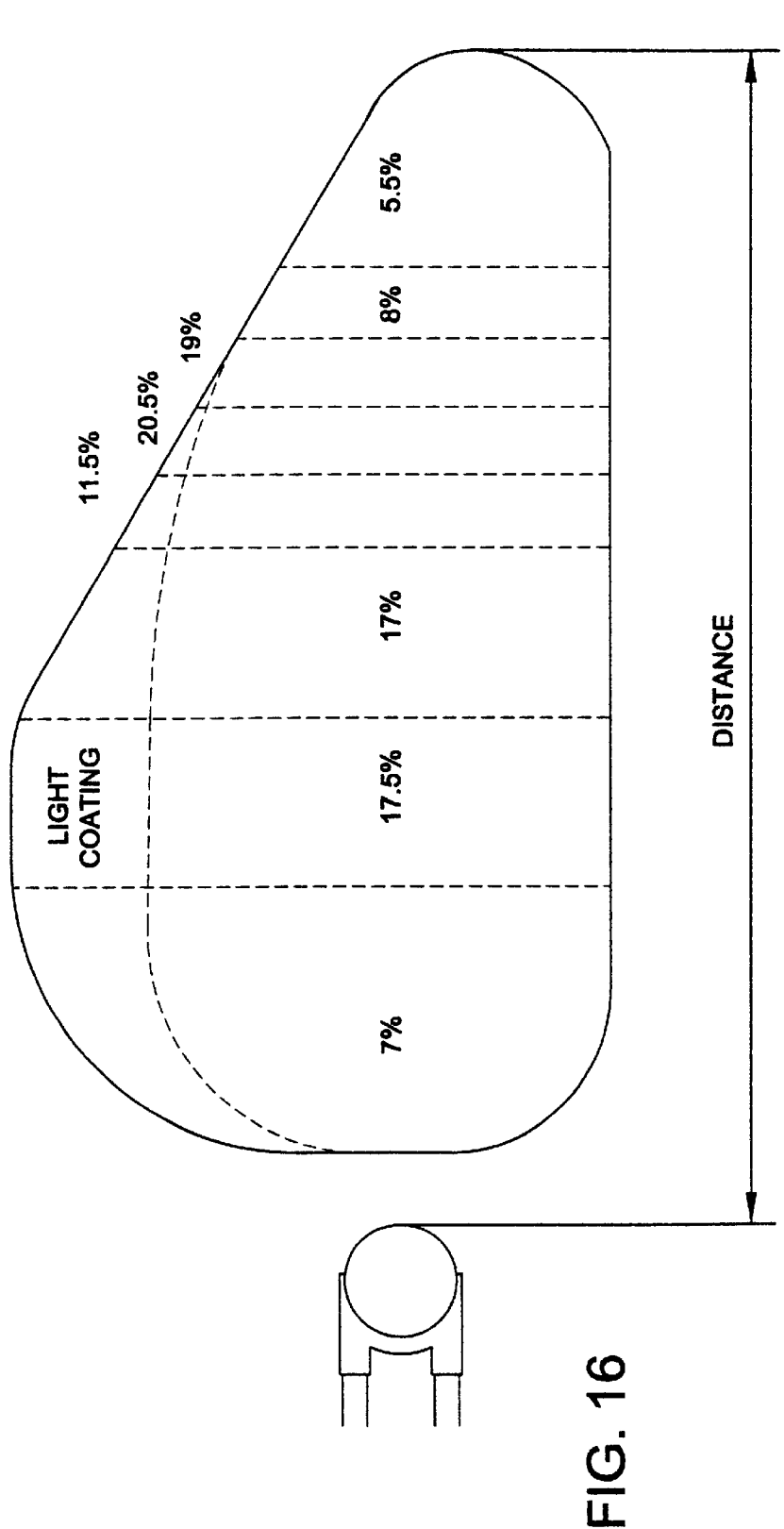
FIG. 16 is a top plan view of another dispersion pattern of material resulting from the use of an embodiment of the invention.
Figure 17:
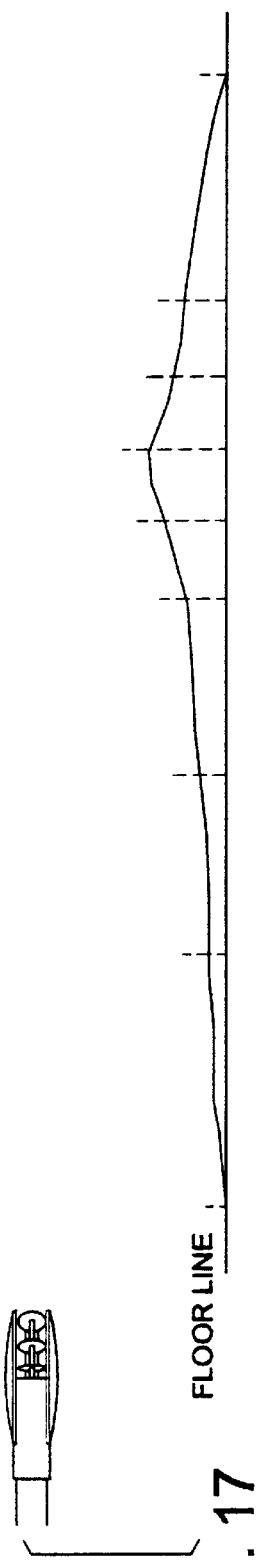
FIG. 17 is a side elevational view of the pattern shown in FIG. 16.

Alternatively to conveying bulk material through a centrally located access opening in the end wall of a container with a single cantilevered section of a mechanical conveyor, material may be loaded into a container having a pair of transversely spaced access openings by means of a pair of transversely spaced cantilevered sections of a mechanical conveyor as shown in FIGS. 11 and 13. Referring to such figures, there is illustrated a truck 120 supporting a container 121 which is adapted to be loaded by a loader assembly 122. Container 121 has a substantially rectangular configuration defining a compartment 123. It further includes an upper wall 124 and a rear end wall 125. Provided in rear end wall 125 is a pair of transversely spaced access openings 126 and 127 disposed adjacent upper wall 124. Also provided in end wall 125 is a discharge opening 128 disposed centrally therein adjacent a bottom wall thereof. Disposed within container 121 is a plastic film liner similar to previously described liner 52, having a first set of spouts extendable through openings 126 and 127 and a third spout extendable through discharge opening 128. Loader assembly 122 includes a support frame structure 129, a mechanical conveyor 130 mounted on the support frame structure and a material feed assembly 131 also mounted on the support frame structure. The mechanical conveyor consists of a pair of conveyors 132 and 133 each comparable to mechanical conveyor 54, providing a pair of longitudinal extending, transversely spaced cantilevered sections 134 and 135 each comparable to the cantilevered section described in connection with the embodiment of FIGS. 1 through 6. Cantilevered sections 134 and 135 are adapted to be inserted into access openings 126 and 127 in the container end wall as shown in FIG. 12. The rope assemblies of conveyors 132 and 133 are adapted to be driven in opposite directions so that discharge housings 134a and 135a of cantilevered sections 134 and 135 disposed within compartment 123 will cause material to be uniformly dispersed within such compartment.

Support frame structure 129 is provided with a platform 136 supported on a set of wheels 137 to allow the support frame structure and correspondingly mechanical conveyors 132 and 133 mounted thereon to be displaced toward and away from a truck mounted container to be loaded.

Feed assembly 131 consists of a material holding hopper 138 supported on support frame structure 129 communicating at its lower end with a pair of screw conveyors 139 communicating with the base housings of the mechanical conveyors. Bulk material deposited in hopper 138 is caused to be discharged into the screw conveyors which feed the material into the base housings of the mechanical conveyors. The rope assemblies of the mechanical conveyors driven in opposite directions convey the material from the base housings to the discharge housings thereof from where the material is dispersed within the compartment of the container. The operation of the embodiment shown in FIGS. 11 through 13 is similar to the operation of the embodiment shown in FIGS. 1 through 3 with the exception that two cantilevered sections of two mechanical conveyors are adapted to be inserted through a pair of transversely spaced access openings in the end wall of the container for filling the container. Preferably, access openings 126 and 127 in the container end wall are disposed adjacent the upper corners of the end wall so that the cantilevered sections of the conveyors will be positioned in the upper corners of the container compartment to assure a uniform dispersion of the material injected into the compartment and a maximum filling of the compartment. Also, the lengths of the cantilevered sections of the mechanical conveyors are formed of different lengths, and the directions of rotation of the sprockets in the discharge housings of the cantilevered sections are selected so as to cause the material being dispersed into the compartment container to be directed inwardly and deposited within the entire length of the compartment.

Figure 19:
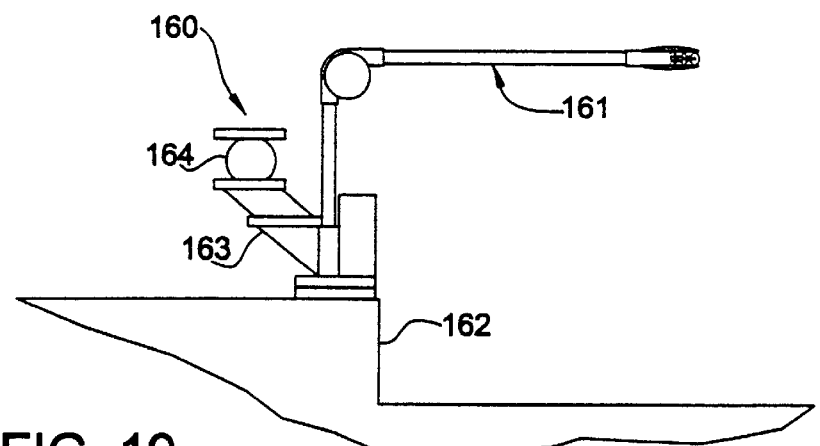

FIG. 19 illustrates a loader apparatus 140 embodying the present invention, similar to the embodiment shown in FIGS. 1 through 6. It includes a mechanical conveyor 141 and a material feeding member 142. The conveyor includes a support member 143 rigidly mounted on the edge of a loading dock 144, a base housing 145 mounted on the support member, a pair of vertically disposed, transversely spaced conduits 146, 146, a pair of transversely spaced housings 147, 147, horizontally disposed, transversely spaced conduits 148, 148 and a discharge housing 149. As in the previously described embodiments, sprockets are mounted in the several housings and a rope assembly is disposed along a circuitous path within the housings and conduits for conveying material from the base housing to the discharge housing. Discharge housing 149 is similar in construction and operation to discharge housing 59 described in connection with the embodiment shown in FIGS. 1 through 6, and conduits 148, 148 and discharge housing 149 constitute a cantilevered section of the conveyor which is adapted to be received within an access opening in an end wall of a container mounted on the flat bed of a truck and maneuvered rearwardly toward the edge of the loading docket. Material feed member 142 consists merely of an inclined chute communicating at its lower end with the base housing of the conveyor through which bulk material to be conveyed to the container, may be fed. The rope assembly provided in the mechanical conveyor is driven by a motor mounted in a housing 150 and operatively connected to the sprocket disposed in base housing 145.

Figure 18:
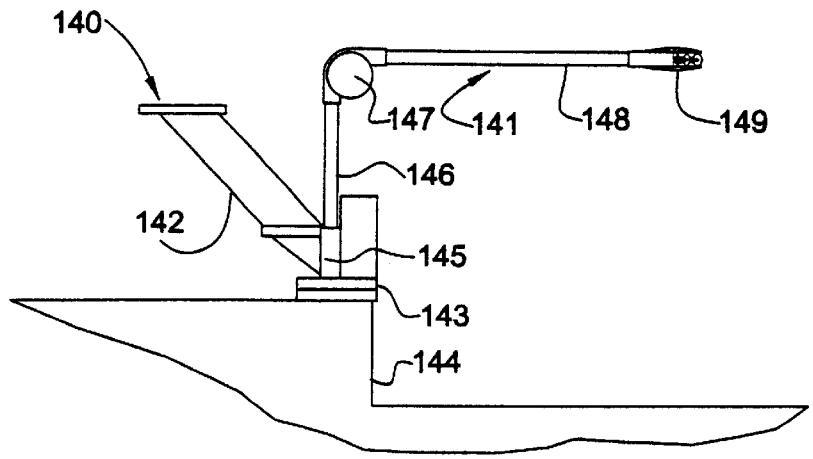
FIGS. 18 through 26 are side elevational views of conveyors incorporating still further embodiments of the present invention.

FIG. 19 illustrates a loader apparatus 160 which is a modification of the apparatus shown in FIG. 18. It consists of a mechanical conveyor 161 similar to conveyor 141, rigidly supported on the end of a loading dock 162, and a material feed assembly 163 similar to feed assembly 142 with the exception of being provided with a rotary valve 164 through which material to be conveyed to the container may be fed.

Figure 20:
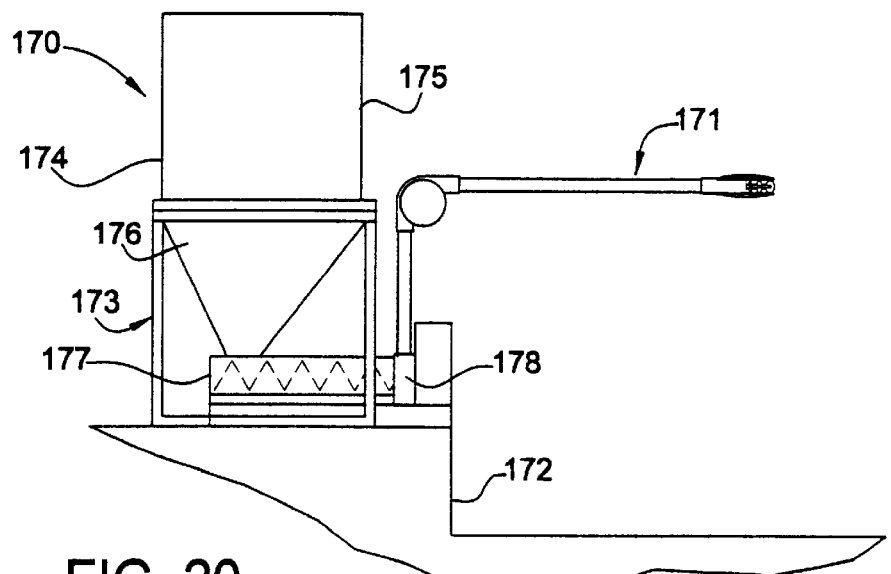

Loader apparatus 170 shown in FIG. 20 also is a modification of the embodiment shown in FIG. 18 and includes a stationary mechanical conveyor 171 mounted at the end of a loading dock 172, a support frame structure 173 and a material feeding assembly 174. The feeding assembly generally consists of a material holding vessel 175 mounted on the support frame structure and provided with a lower hopper section 176 adapted to gravity feed material into a screw conveyor 177 which conveys such material to a base housing 178 of the mechanical conveyor.

Figure 21:
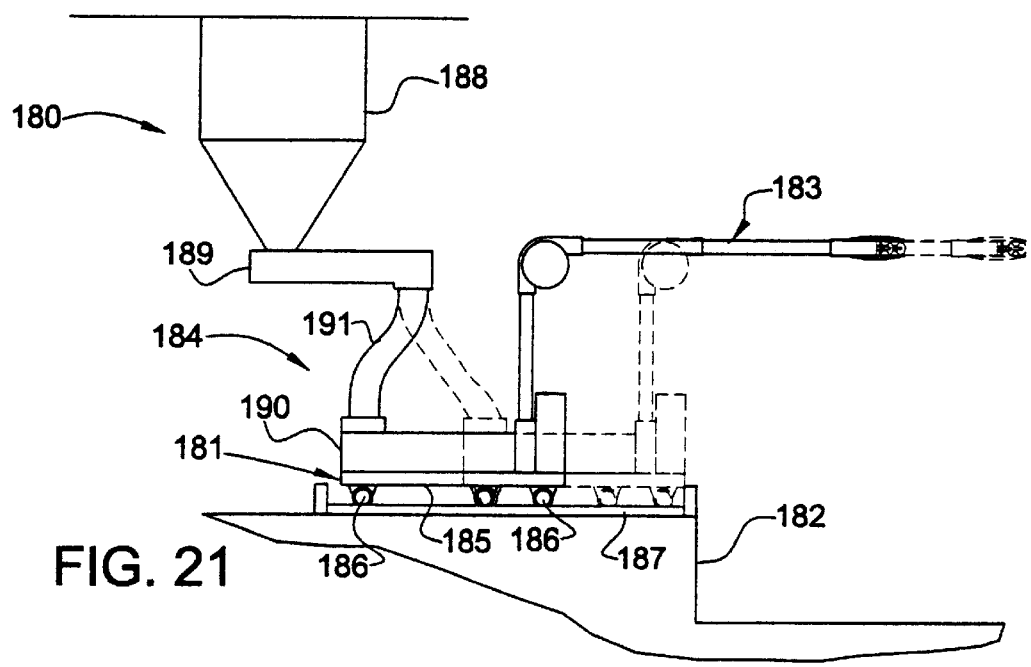

Loader apparatus 180 shown in FIG. 21 is a modification of the loader apparatus shown in FIGS. 1 through 6, and consists of a support structure 181 supported at the end of a loading dock 182, a mechanical conveyor 183 mounted on the support structure and a material feeding assembly 184 partially supported on the support structure. The support structure essentially consists of a platform 185 supported on a set of wheels 186 adapted to ride along a track 187 disposed perpendicular to the edge of the loading docket. Mechanical conveyor 183 is similar to conveyor 141 with the exception of being mounted on a front end of the displaceable support structure. It is adapted to be extended and retracted along with the movement of the support structure. Material feeding assembly 184 includes an overhead, stationary material holding vessel 188, an overhead stationary screw conveyor 189, a lower screw conveyor 190 mounted on the movable frame structure 181 and a flexible conduit 191. Vessel 188 is provided with a lower hopper section 192 which functions to feed material to be loaded into an inlet of stationary screw conveyor 189. Flexible conduit 191 interconnects the discharge end of stationery screw conveyor 189 with the inlet end lower screw conveyor 190. Material fed into screw conveyor 190 is conveyed thereby to the base housing of the mechanical conveyor wherefrom it is conveyed by the rope assembly thereof to the discharge head of the mechanical conveyor.

The embodiment shown in FIG. 21 permits the use of a stationary bulk material holding means and a displaceable mechanical conveyor. Such arrangement is facilitated by the flexible conduit disposed between the discharge end of the overhead screw conveyor and the inlet end of the lower screw conveyor mounted on the displaceable support structure. When not in use, the support structure normally is disposed in a rearwardly, retracted position. Whenever a container to be loaded is positioned at the end of the loading dock, similarly as shown in FIG. 1, the support structure is advanced toward the end of the loading dock so that the cantilevered section of the mechanical conveyor aligned with the access opening in the end wall of the container will be advanced through such opening into the interior of the container. The flexibility of connecting conduit 191 permits such displacement of the support structure while maintaining the connection of the material feeding assembly to the mechanical conveyor. Once the cantilevered section of the mechanical conveyor is in position within the interior of the container, the drives of the rope assembly in the mechanical conveyor and the screw conveyors may be actuated to cause material in vessel 188 to be conveyed through screw conveyor 189, flexible conduit 191, screw conveyor 190 and mechanical conveyor 183 from where it is dispersed within the compartment of the container. During the loading operation as described, the support structure of the apparatus may be displaced along the length of its line of travel to correspondingly displace the discharge housing of the mechanical conveyor along a line of travel within the container compartment to correspondingly alter the dispersement of the material within compartment.

Figure 22:
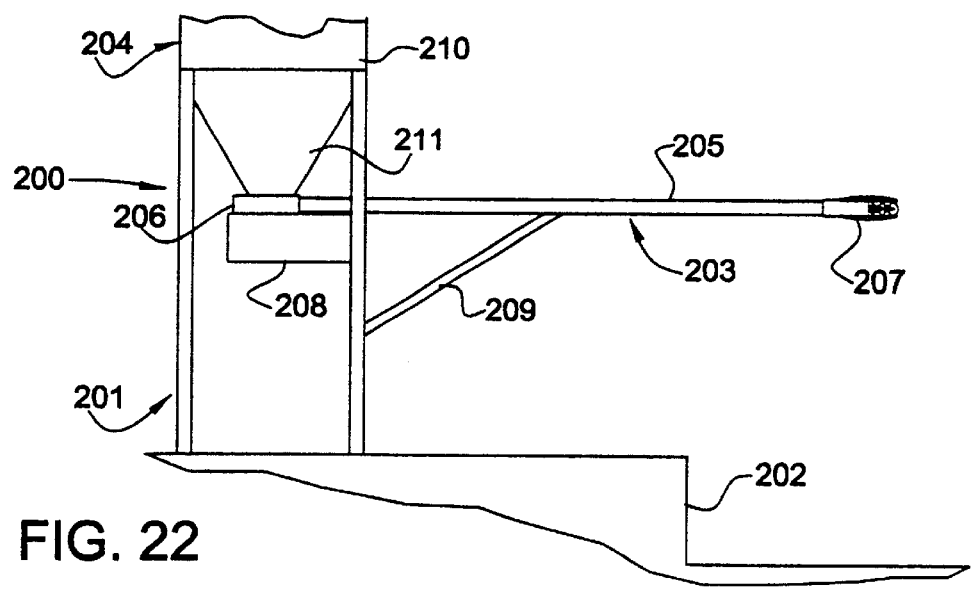

FIG. 22 illustrates a loader apparatus 200 which is a further embodiment of the present invention. The apparatus includes a stationary, support frame structure 201 positioned adjacent the end of a loading dock 202, a mechanical conveyor 203 mounted on the support structure and a material feeding assembly 204 mounted on the support frame structure and operatively connected to the mechanical conveyor. The mechanical conveyor lies in an elevated, horizontal plane and projects from the support frame structure to a point beyond the edge of the loading dock. Its height is fixed so that whenever a truck having a container loaded thereon provided with the type of access opening as previously described, is backed up to the loading dock with the access opening in the container aligned longitudinally with the mechanical conveyor, the leading end of the mechanical conveyor will be received within the access opening of the container to position the leading end of the mechanical conveyor within the compartment of the container. Conveyor 203 includes a pair of horizontally disposed, transversely spaced conduits 205, 205 interconnecting and intercommunicating a base housing 206 and a discharge housing 207, sprockets mounted in the base and discharge housings, a rope assembly reeved about such sprockets and lying along a circuitous path provided by housings 206 and 207 and conduits 205, 205 and a drive motor mounted in a motor housing 208 supported on the support frame structure, and operatively connected to the sprocket mounted in base housing 206. The major portion of the mechanical conveyor including conduits 205, 205 and discharge housing 207 is cantilevered relative to support frame structure 201, and further is supported by a pair of support struts 209, 209. Material feeding assembly 204 consists of a material holding vessel 210 mounted on the support frame structure above the rear end of the mechanical conveyor, having a lower hopper section 211 communicating at the lower end thereof with the interior of base housing 206.

In the use of the apparatus shown in FIG. 22, a truck provided with a container mounted on a flat bed thereon to be filled with material contained in vessel 188 is backed up to the end of loading dock 202 in a manner whereby the access opening in the container is longitudinally aligned with the mechanical conveyor so that as the truck is backed toward the loading dock, the free end of the mechanical conveyor will be received through the access opening in the container end wall, into the interior of the container. Once the truck is fully backed up, the discharge head of the mechanical conveyor is properly positioned of the container and the spout of the liner disposed in the compartment of the container is wrapped around conduit 205, 205 to seal the access opening, the motor for the sprocket contained in base housing 206 is started to cause material gravity fed into the base housing of the conveyor to be conveyed by the rope assembly of the conveyor to the discharge housing 207 from where it is dispersed within the compartment of the container. Discharge housing 207 is similar in construction and operation to discharge housing 59 described in connection with the embodiment shown in FIGS. 1 through 6. In this embodiment, the position of the discharge housing within the container compartment may be varied by repositioning the vehicle along a longitudinal line of travel. The principle advantage of this particular embodiment is simplicity of construction. It requires simply a stationary support frame structure supporting a conventional, stationary material holding vessel, and a stationary simple form of a mechanical conveyor.

Figure 23:
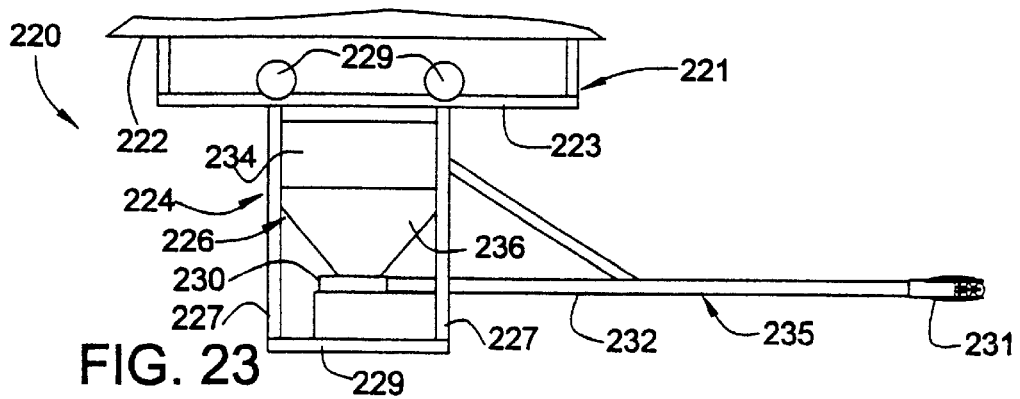

FIG. 23 illustrates a loader apparatus 220 similar to the apparatus shown in FIG. 22 with the exception that the major portion of the apparatus is displaceable along a longitudinal line of travel. The apparatus includes a stationary support frame structure 221 suspended from an overhead building structure 222 and provided with a longitudinal track 223, a displaceable support frame structure 224 suspended from stationary support structure 221, a mechanical conveyor 225 disposed horizontally, supported at a rear end thereof on the lower end of the movable support frame structure and projecting longitudinally and a material feeding assembly 226 mounted on the movable support frame structure. The movable support frame structure is provided with a plurality of depending frame members 227 connected at a lower end by a base plate member 228 and connected at their upper ends to a set of wheels 229 adapted to ride along longitudinally disposed track 223. Mechanical conveyor 225 is similar to mechanical conveyor 203 and includes a base housing 230 supported at the lower end of the movable support frame structure and having a drive sprocket mounted therein, a longitudinally spaced discharged housing 231 having a driven sprocket mounted therein, similar in construction and operation to discharge housing 68, a pair of longitudinally disposed, transversely spaced conduits 232, 232 interconnecting and intercommunicating base and discharge housings 230 and 231, and a rope assembly disposed in such housings and connecting conduits, reeved around the sprockets mounted in housings 230 and 231. The sprocket mounted in base housing 230 is driven by a motor mounted in housing 233 supported on base member 222 of the movable support frame structure. Material feeding assembly 226 includes a material holding vessel 234 mounted on the upper end of the movable support frame structure, provided with a lower hopper section 235 communicating at a lower end thereof with the interior of base housing 230 of the mechanical conveyor.

Loader apparatus 220 is intended to be suspended from a building structure disposed adjacent a loading dock 236. Mechanical conveyor 225 is positioned at a height corresponding to the level of an access opening in a container mounted on a flat bed of a vehicle to be positioned at the end of the loading dock to permit the insertion of the cantilevered end of the mechanical conveyor through such access opening into the interior of the container. The mechanical conveyor is spaced below and disposed parallel to guide tracks 223 of stationary support frame structure 221 so that when the movable frame structure is displaced relative to the stationary support frame structure, the mechanical conveyor will correspondingly be displaced along a longitudinal line of travel. The movable support frame structure along with the mechanical conveyor may be displaced along a longitudinal line of travel either by motors operating wheels 229 or possibly manually by a handle or rope depending from the movable support frame structure, depending upon the size and weight of the movable portion of the apparatus, the accessibility to it and the rolling friction of wheels 229 supporting the displaceable portion of the apparatus.

When not in use, the movable support frame structure is positioned at its rearmost position adjacent the rear end of guide tracks 223. Whenever a vehicle provided with a container is to be filled with material contained in vessel 234, the vehicle is backed towards the end of loading dock 236 with the access opening in the rear end wall of the container being positioned in longitudinal alignment with the cantilevered portion of mechanical conveyor 225. Once the vehicle has been backed up to the loading dock and the liner spout in the access opening of the container end wall is opened to permit the insertion of the leading end of the cantilevered portion of the mechanical conveyor, the movable support frame structure of the apparatus is advanced toward the container thus positioned to cause the insertion of the leading end of the conveyor through the access opening into the interior of the container. When the discharge housing of the conveyor is properly positioned within the container, the drive motor of the conveyor is operated to drive the rope assembly of the conveyor and thus cause material flowing from vessel 234 to flow into the base housing of the conveyor, be transported by the rope assembly of the conveyor to the discharge housing thereof and be dispersed therefrom into the compartment of the container. During the dispensing of the material within the container, the movable support frame structure may be displaced along its longitudinal line of travel to reposition the discharge housing of the mechanical conveyor along the length of the container, as desired. Upon filling the container, the movable support frame structure is retracted to its rearmost position, withdrawing the leading end of the conveyor from the interior of the compartment, and the access opening is sealed to permit the vehicle to be driven off.

Figure 24:
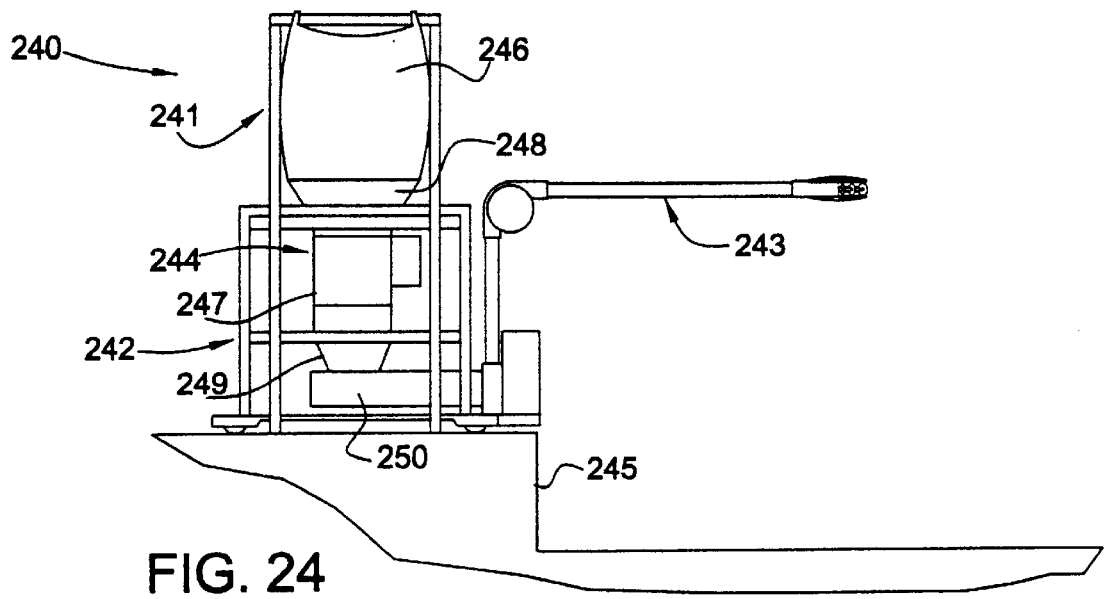

FIG. 24 illustrates a loader apparatus 240 embodying the present invention which includes a stationary support frame structure 241, a movable support frame structure 242, a mechanical conveyor 243 mounted on the movable support frame structure and a material feed assembly 244 also mounted on the movable support structure and operatively connected to the mechanical conveyor. Stationary support frame structure 241 is adapted to be positioned adjacent a loading dock 245 and is adapted to support a suspended material holding bag 246. Mechanical conveyor 243 is supported on movable support frame structure 242 and is similar in construction and operation to mechanical conveyor 54 described in connection with the embodiment shown in FIGS. 1 through 6. Material feeding assembly 244 also is supported on the movable support frame structure and includes an intermediate material conveying section 247, an upper hopper section 248 adapted to receive the lower end of a material holding bag 246 and communicating with an upper inlet end of section 247, and a lower hopper section 249 communicating with an lower outlet of section 247. A screw conveyor 250 further conveys material from hopper section 249 to a base housing 251 of the mechanical conveyor.

When not in use, the movable support frame structure is disposed in a retracted position displaced rearwardly of the stationary support frame structure. When a vehicle hauling a container to be filled is positioned adjacent the end of the loading dock, the movable support frame structure is advanced to the position shown in FIG. 24 so that the cantilevered portion of the mechanical conveyor is received through the access opening in the container rear wall and positioned within the compartment of the container, and upper funnel section 248 thereof is positioned to receive the lower end of a material holding bag 246. With the movable support frame structure thus positioned, a fork lift truck or other means may be used to suspend a material holding bag 246 from the upper end of the stationary support frame structure with the lower end of the bag received in the upper hopper section 248. The lower end of the bag then may be opened to allow material to gravity flow through intermediate section 244 and lower hopper section 245 into the inlet end of screw conveyor 249. Operation of the screw conveyor and the mechanical conveyor would then cause material fed into the screw conveyor to be conveyed and dispersed within the interior of the container.

Figure 25:
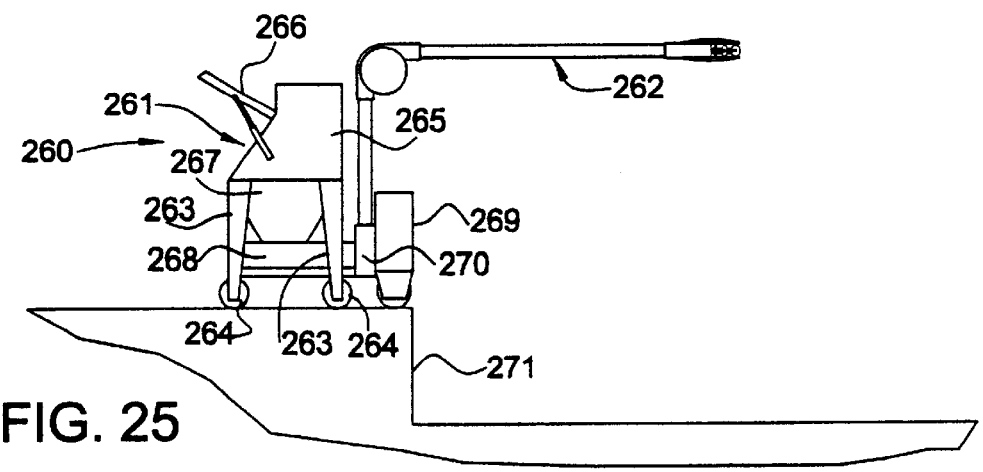

Loader apparatus 260 shown in FIG. 25 includes a bag dump assembly 261 operatively connected to a mechanical conveyor 262. The bag dump assembly is provided with a set of legs 263 supported on a set of wheels 264, a housing 265 supported on the upper ends of such leg members, having an opening in a rear side thereof closable by a door 266, a hopper 267 depending from housing 265 and communicating therewith and a screw conveyor 268 adapted to receive material from hopper 267. Mechanical conveyor 262 is similar in construction and operation to mechanical conveyor 54 described in connection with the embodiment shown in FIGS. 1 through 6, and includes a motor housing 269 supported on a set of wheels and a base housing 270 connected to screw conveyor 268 and adapted to receive material therefrom.

Apparatus 260 is particularly adapted to accommodate the loading of material contained in small bags into a transportable container. In the use of the apparatus, whenever a vehicle loaded with a container is positioned adjacent loading dock 271, the apparatus may be maneuvered manually to insert the cantilevered section of the mechanical conveyor through the access opening provided in the end wall of the container. With the cantilevered section of the mechanical conveyor thus inserted in the container to be filled, the motors for the screw conveyor and the mechanical conveyor may be operated to drive the screw member in the screw conveyor and the rope assembly in the mechanical conveyor. Bags containing bulk material to be loaded into the container are then ripped opened by the operator and the contents thereof are dumped into housing 265 through the opening therein. The bulk of such material is caused to flow downwardly through hopper 267 to the screw conveyor from where it is conveyed by the screw conveyor and the mechanical conveyor to the interior of the container being filled. Typically, housing 265 will include a filter unit which will operate to draw airborne particles of material being dumped into housing 265, into such housing and thus prevent the loss of material.

Figure 26:
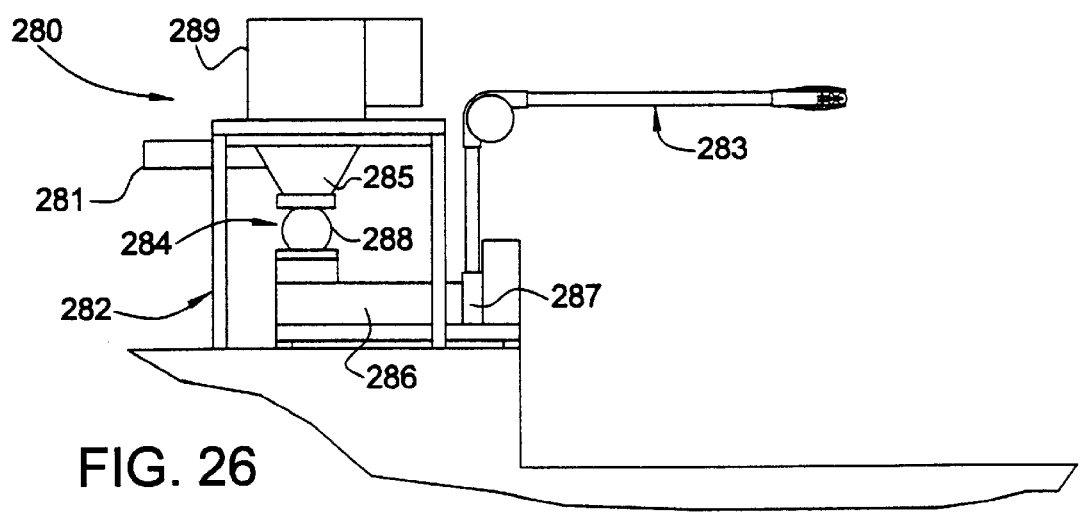

Apparatus 280 shown in FIG. 26 is particularly suited for loading material into a container supplied by a pneumatic conveying line 281. The apparatus includes a stationary support frame structure 282, a mechanical conveyor 283 and a material feeding assembly 284. The mechanical conveyor is similar in construction and operation to mechanical conveyor 54 described in connection with the embodiment shown in FIGS. 1 through 6. Material feeding assembly 284 includes a hopper 285 supported on structure 282, a screw conveyor 286 connected to a base housing 287 of the mechanical conveyor and an air lock disposed between the lower outlet of hopper 285 and the inlet of screw conveyor 286. Pneumatic conveying line 281 is connected to hopper 285 to supply bulk material to be loaded therein, which material is caused to flow downwardly through air lock 288 into the inlet end of screw conveyor 286. As previously described, the screw conveyor conveys such material to the mechanical conveyor which conveys the material to the interior of the compartment being filled in a manner as previously described. The material feeding assembly further is provided with a filter unit 289 supported on the support frame structure, having an inlet communicating with hopper 285. As a large volume of air carrying bulk material is fed through line 281 into receiving hopper 285, the material will be caused to flow through air lock 288 which precludes the passage of the carrier air, and the air in hopper 285 will be exhausted through filter unit 289 which functions in the conventional manner to filter out material particles.

The present invention provides a simple, efficient and safe means for loading, transporting and unloading bulk materials. The use of a mechanical type of conveyor in the manner indicated is highly effective in conveying bulk material without the disadvantages of prior art systems and particularly pneumatic conveying systems. It provides a simple construction which is comparatively economical to manufacture, operate and maintain. It may be operated with less energy, is easily maneuverable and may accommodate a variety of material feeding devices. It does not require the supply of a large volume of air, will not overpressurize the container compartment and does not present a substantial dust control problem. Because the material particles are injected into the container compartment at a speed substantially less than the speed of particles dispensed by a pneumatic conveying system, the present invention is less apt to rupture or otherwise damage the liner within the container, resulting in a possible contamination and/or loss of material. The cantilevered feature of the mechanical conveyor of the invention and the capability of displacing such conveyor provides for the advantageous positioning of the dispensing head of the conveyor within the container to more uniformly dispense the material. The shallow construction of the cantilevered section of the mechanical conveyor inserted into the container compartment, and the particular orientation of the sprocket at the end of the cantilevered section allows the inserted conveyor section to be positioned close to the top wall of the container thus optimizing the amount of material loaded into the container. The centrifugal force provided by the travel of the rope assembly around the sprocket mounted in the inserted end of the conveyor provides a broad dispersement pattern of material injected into the container which thus provides a widespread deposit of material in the container. The displaceability of the cantilevered section of the conveyor, the use of a pair of inserted cantilevered sections of different lengths and the feature of reversing the direction of drives of the rope assemblies provided in such conveyor sections, further provide for a greatly improved method of handling bulk materials.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A bulk material handling system comprising:

a transportable container defining a compartment, having an upper wall and an end wall provided with a closable access opening in an upper end thereof; and an apparatus including a support means, a first housing mounted on said support means, a second housing, a pair of conduits each interconnecting and intercommunicating with said housings to provide a circuitous path, a housing mounted in each of said housings with a sprocket mounted in said second housing having a substantially vertical axis of rotation, a rope assembly having an endless rope disposed in said housings and said conduits, along said circuitous path, reeved about said sprockets and provided with a plurality of discs secured to and spaced along said rope, said first housing having an inlet for feeding bulk material therein and said second housing having an arcuate outlet opening relative to the periphery of said sprocket mounted therein whereby bulk material fed into said first housing will be conveyed by said rope assembly to said second housing and propelled substantially tangentially through said outlet opening as said rope assembly travels about said sprocket in said second housing; and said conduits having a cantilevered section, said second housing forming part of said cantilevered section, insertable into said compartment of said container through said access opening in said end wall of said container for loading said bulk material in said compartment.

2. A system according to claim 1 wherein said access opening in said container end wall is disposed in the center of said end wall.

3. A system according to claim 1 wherein said access opening in said container end wall is disposed adjacent a side wall of said container.

4. A system according to claim 1 including a pair of access openings in said container end wall, each being disposed adjacent a side wall of said container.

5. A system according to claim 1 wherein said support means is movable along a line of travel.

6. A system according to claim 1 wherein said support means rests on a support structure.

7. A system according to claim 1 wherein said support means is supported by an overhead structure.

8. A system according to claim 1 wherein said compartment of said container is provided with a liner having an access opening through which said cantilevered section may be inserted for dispersing said bulk material within said liner.

9. A system according to claim 1 wherein said container is transportable on intermodal craft.

10. A system according to claim 1 wherein said container is transportable on one or more forms of craft selected from a group including land, water and air craft.

11. A system according to claim 1 wherein said end wall of said container includes a closable discharge outlet disposed adjacent a bottom wall of said container.

12. A system according to claim 1 wherein said container is mountable on a truck.

13. A system according to claim 12 wherein said container is tiltable relative to said truck for gravity discharging bulk material contained therein through a discharge outlet.

14. A system according to claim 1 wherein said end wall of said container is provided with a pair of access openings, each disposed adjacent said top wall of said container and a side wall thereof, and a pair of said conveyors each having a cantilevered section insertable in one of said access openings.

15. A system according to claim 14 wherein said cantilevered sections are of different lengths.

16. A system according to claim 1 including a vent line supported on said support means and having an inlet end insertable in said access opening in said container end wall.

17. A system according to claim 16 wherein said vent line is operatively connected to a filter unit.

18. A system according to claim 17 wherein said filter unit is mounted on said support means.

19. A system according to claim 1 including a first craft for transporting said container from a first to a second destination, a second craft for transporting said container from said second destination to a third destination, a third craft for transporting said container from said third destination to a fourth destination, means for loading and unloading said container with respect to said craft, and means for tilting said container at said fourth destination.

20. A system according to claim 19 wherein each of said craft is selected from a group including a truck, a rail car, a water craft and an aircraft.

21. A system according to claim 19 including a fourth craft for transporting said container from a fourth destination to a fifth destination, and said tilting means is operable to tilt said container at said fifth destination.

22. A system according to claim 21 wherein each of said craft is selected from a group including a truck, a rail car, a water craft and an aircraft.

23. A system according to claim 1 including means for feeding bulk material into said inlet of said first housing.

24. A system according to claim 23 including a vessel mounted on said support means having an inlet connectable to means for pneumatically conveying bulk material to said vessel, and an outlet communicating with said inlet of said first housing, an air lock disposed between said vessel and said first housing and a filter assembly having an inlet communicable with said vessel.

25. A system according to claim 23 wherein said feeding means comprises a gravity chute.

26. A system according to claim 25 wherein said chute is provided with a rotary feed valve.

27. A system according to claim 23 wherein said feeding means comprises a screw conveyor.

28. A system according to claim 27 including a bulk material holding vessel having an outlet communicating with an inlet of said screw conveyor.

29. A system according to claim 28 including a rotary feed valve disposed between said vessel and said screw conveyor.

30. A system according to claim 28 including a flexible conduit intercommunicating said vessel and said screw conveyor.

* * * * *